United States Patent
Wilson et al.

(10) Patent No.: US 10,597,519 B2
(45) Date of Patent: Mar. 24, 2020

(54) SEVERELY HYDROTREATED NAPHTHENIC DISTILLATE CONTAINING RUBBER COMPOSITIONS

(71) Applicant: ContiTech USA, Inc., Fairlawn, OH (US)

(72) Inventors: Flint Wilson, Mt. Pleasant, IA (US); Jeffrey T. Epperson, Mount Pleasant, IA (US); Jeffrey P. Dotson, Riverside, IA (US)

(73) Assignee: ContiTech USA, Inc., Fairlawn, OH (US)

( * ) Notice: Subject to any disclaimer, the term of this patent is extended or adjusted under 35 U.S.C. 154(b) by 0 days.

(21) Appl. No.: 16/313,023

(22) PCT Filed: Sep. 18, 2017

(86) PCT No.: PCT/US2017/051956
§ 371 (c)(1),
(2) Date: Dec. 22, 2018

(87) PCT Pub. No.: WO2018/075175
PCT Pub. Date: Apr. 26, 2018

(65) Prior Publication Data
US 2019/0338107 A1 Nov. 7, 2019

Related U.S. Application Data

(63) Continuation of application No. 15/297,168, filed on Oct. 19, 2016, now abandoned.

(51) Int. Cl.
*C08K 13/02* (2006.01)
*A47L 9/24* (2006.01)
*C08K 5/01* (2006.01)

(52) U.S. Cl.
CPC ............ *C08K 13/02* (2013.01); *A47L 9/24* (2013.01); *C08K 5/01* (2013.01)

(58) Field of Classification Search
None
See application file for complete search history.

(56) References Cited

U.S. PATENT DOCUMENTS 3,083,124 A    3/1963  Rahmes
8,143,338 B1 * 3/2012  Pompei ............... B29D 30/54
                                            524/474
2009/0247705 A1 * 10/2009 Hasegawa ............... C08L 9/02
                                            525/236
2010/0063178 A1   3/2010  Hogan
2013/0035436 A1 * 2/2013  Lamkin ................. C08L 23/16
                                            524/525
2014/0135437 A1 * 5/2014  Sandstrom ........... B60C 1/0016
                                            524/313

FOREIGN PATENT DOCUMENTS

| EP | 0040319 A1 | 11/1981 |
| EP | 0315363 A2 | 5/1989 |
| EP | 0751156 A2 | 1/1997 |
| EP | 0870800 A1 | 10/1998 |
| EP | 2468815 A1 | 6/2012 |
| EP | 2733168 A1 | 5/2014 |
| EP | 2733170 A1 | 5/2014 |
| GB | 828814 A | 2/1960 |
| JP | 2013060525 A | 4/2013 |
| WO | 2015122415 A1 | 8/2015 |
| WO | 2015130776 A1 | 9/2015 |

OTHER PUBLICATIONS

International Search Report dated Nov. 22, 2017 of international application PCT/US2017/051956 on which claimed priority this application.

* cited by examiner

*Primary Examiner* — Ana L. Woodward
(74) *Attorney, Agent, or Firm* — David L. Cate; Gregory Adams

(57) ABSTRACT

A composition includes at least one natural or synthetic rubber material, a severely hydrotreated naphthenic distillate incorporated in amount equal to or less than 30% by weight of the composition, and a sulfur curative. After curing, the composition provides acceptable cold flexibility at a temperature lower than −60 deg C., at a temperature as low as −68 deg C., or even at a temperature as low as −73 deg C. In some aspects, the at least one natural or synthetic rubber material is a synthetic rubber such as, but not limited to, an ethylenepropylene-diene copolymer rubber. In some cases, where used, the ethylenepropylene-diene copolymer rubber is selected from the group consisting of ethylene-propylene-cyclopentadiene terpolymer, ethylene-propylene ethylidene norbornene terpolymer, ethylene-propylene-I, and mixtures thereof.

6 Claims, No Drawings

SEVERELY HYDROTREATED NAPHTHENIC DISTILLATE CONTAINING RUBBER COMPOSITIONS

FIELD

The field to which the disclosure generally relates to rubber compositions, and specifically to rubber compositions useful for providing hose or other rubber based articles having extremely low temperature flexibility properties.

BACKGROUND

This section provides background information to facilitate a better understanding of the various aspects of the disclosure. It should be understood that the statements in this section of this document are to be read in this light, and not as admissions of prior art.

Railroad cars and certain types of trucks having pneumatic brake systems use flexible air hoses which extend between separate railroad cars or portions of a tractor-trailer assembly for operation of the pneumatic brake system. In such systems, the brake system is connected with a source of compressed air by a flexible tube or hose, which kept pressurized at about 8.4-10.5 kg/cm2 (120-150 psi).

Typically, air brake hoses are formed of a multi-layer construction, with inner and outer layers being formed of a material which resistant to the surrounding environment. In particular, the inner and outer layers are formed from a material which is not sensitive to stress cracking by zinc chloride, such as nylon 11 (polyundecanolactam) or nylon 12 (polydodecanolactam). The inner and outer layers are separated by an intermediate layer of woven or braided material, such as a polyester fiber, which acts as a reinforcement.

Often, for the outer layer, air brake hoses utilize ethylenepropylene-diene copolymer rubber compound plasticized with 4900 SUS napthenic process oil. Articles, such as air brake hoses, using such material become brittle, when exposed to temperatures below −65 deg F. (−54 deg C.) exhibit low temperature embrittlement, which leads to failure in articles formed of such materials.

Thus, there exists a need for combinations of materials which form articles, such as air brake hoses, having acceptable extreme low temperature flexibility, such need met at least in part, with the following disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments of the disclosure, a composition is provided which includes at least one natural or synthetic rubber material, a severely hydrotreated naphthenic distillate incorporated in amount equal to or less than 30% by weight of the composition, and a sulfur curative. After curing, the composition provides acceptable cold flexibility at a temperature lower than −60 deg C., at a temperature as low as −68 deg C., or even at a temperature as low as −73 deg C. In some aspects, the at least one natural or synthetic rubber material is a synthetic rubber such as, but not limited to, an ethylenepropylene-diene copolymer rubber. In some cases, where used, the ethylenepropylene-diene copolymer rubber is selected from the group consisting of ethylene-propylene-cyclopentadiene terpolymer, ethylene-propylene ethylidene norbornene terpolymer, ethylene-propylene-I, and mixtures thereof.

In some other embodiments of the disclosure, a composition for forming at least one layer of a hose is provided, which includes at least one natural or synthetic rubber material, a severely hydrotreated naphthenic distillate incorporated in amount equal to or less than 30% by weight of the composition, and a sulfur curative. In some cases, after curing, the composition provides acceptable cold flexibility at a temperature as low as −60 deg C., as low as −68 deg C., or even as low as −73 deg C. The at least one natural or synthetic rubber material may be an ethylenepropylene-diene copolymer rubber, such as, but limited to ethylene-propylene-cyclopentadiene terpolymer, ethylene-propylene ethylidene norbornene terpolymer, ethylene-propylene-I, or mixtures thereof. The compositions may further include a curing accelerator, such as mercaptobenzothiazole. The compositions may be useful in forming at least one layer of an air brake hose.

In yet other embodiments of the disclosure, compositions include ethylenepropylene-diene copolymer rubber selected from the group consisting of ethylene-propylene-cyclopentadiene terpolymer, ethylene-propylene ethylidene norbornene terpolymer, ethylene-propylene-I, and mixtures thereof, severely hydrotreated naphthenic distillate incorporated in amount equal to or less than 30% by weight of the composition, a sulfur curative, and a mercaptobenzothiazole curing accelerator. In some cases, after curing, the composition provides acceptable cold flexibility at a temperature as low as −60 deg C., as low as −68 deg C., or even as low as −73 deg C.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the materials used in the present disclosure are described herein as comprising certain components, it should be understood that the materials could optionally comprise two or more chemically different materials. In addition, the materials can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value, concentration and/or amount range listed or described as being useful, suitable, or the like, is intended that any and every point within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

For purposes of this disclosure, and the claims thereto, the term "severely hydrotreated naphthenic distillate" includes any naphthenic distillate derived from petroleum crude oil that has been subjected to refining steps, such as distillation, solvent processing, severely hydrotreating, and/or dewaxing. This also includes petroleum-based naphthenic distillates that are extensively purified and/or modified through severe processing treatments. It excludes synthetic oils, which have been manufactured by combining monomer units using catalysts and/or heat. In the polymer processing art, naphthenic distillates are often called process oils, extender oils, white oils, technical oils, or food grade oils.

As used herein, the term "naphthenic" describes cyclic (mono-ring and/or multi-ring) saturated hydrocarbons (i.e., cycloparaffins) and branched cyclic saturated hydrocarbons. Also, the term "hydrotreated" and "hydrotreating" has the meaning of the distillates being or having been subject to deep hydrogen treatment for unwanted materials extraction (such as extraction of sulfur, nitrogen and oxygen compounds and some aromatics, enhances the response of added synthetic antioxidants), which may increase the yield of high viscosity index components instead of unwanted low viscosity index components, and in some cases, the process may also reconstruct cracked waxes into branched paraffins that offer excellent low temperature properties.

Embodiments according to the disclosure utilize severely hydrotreated naphthenic distillates in combination with crosslinkable natural or synthetic rubber, or mixtures of rubbers, as well as other suitable conventional rubber additives, to provide cured, or otherwise productive rubber materials to extend acceptable cold flexibility properties at extreme temperature conditions, such as low as about −76 deg F. (−60 deg C.), as low as about −90 deg F. (−68 deg C.), as low as about −100 deg F. (−73 deg C.), or any point in the range of about −60 deg C. to about −73 deg C. Suitable conventional rubber additives include, but are not limited to, fillers, coloring agents, curing agents, accelerators, activators and the like. Embodiments according to the disclosure are suitable anywhere good weatherability is needed as well as very low operating conditions are present for such items as low temperature air brake hose, fire hoses, air hoses, heater hoses, twinline hoses, jack hammer hoses, construction hoses, and the like.

In general, any rubber that can be crosslinked by a sulfur curative can be used to make the compositions according to the disclosure. Sulfur cured describes the vulcanization process typical of making rubber. Mixtures of rubbers may also be used. Examples of rubbers useful according to the disclosure, include, without limitation, natural rubber such as those based on polyisoprene.

Synthetic rubbers may also be used in accordance with the disclosure. Examples include, without limitation, synthetic polyisoprenes, polybutadienes, acrylonitrile butadiene rubber, styrene acrylonitrile butadiene rubber, polychloroprene rubber, styrene-butadiene copolymer rubber, isoprene-isobutylene copolymer rubber and its halogenated derivatives, ethylenepropylene-diene copolymer rubbers such as ethylene-propylene-cyclopentadiene terpolymer, ethylene-propylene ethylidene norbornene terpolymer, and ethylene-propylene-I, 4-hexadiene terpolymer, butadiene-propylene copolymer rubber, butadiene-ethylene copolymer rubber, butadiene-isoprene copolymer, polypentenamer, styrene-butadiene-styrene block copolymers, epoxidized natural rubber and their mixtures. In general, such compounds are characterized by repeating olefinic unsaturation in the backbone of the polymer, which generally arises from the presence of butadiene or isoprene monomers in the polymer structure.

The compositions include any suitable amount of natural and/or suitable crosslinkable rubber, and in some embodiments, the compositions include the rubber(s) in an amount from about 15% by weight to about 35% by weight, from about 20% by weight to about 30% by weight, or even from about 22% by weight to about 28% by weight.

Conventional sulfur based curing agents may be used in the compositions. Such curing agents are well known in the art and include elemental sulfur as well as a variety of organic sulfide, disulfide and polysulfide compounds. Examples include, without limitation, vulcanizing agents such as morpholine disulfide, 2-(4'-morpholinodithio) benzothiazole, and thiuram compounds such as tetramethylthiuram disulfide, tetraethylthiuram disulfide and dipentamethylenethiuram tetrasulfide. The vulcanizing agents may be used alone or in combination with each other. In an embodiment, sulfur is used as the curing agent.

The rubber compositions of the disclosure also in general contain one or more curing accelerators. Such accelerators and co-accelerators are known in the art and include without limitation, those based on dithiocarbamate, thiazole, amines, guanidines, xanthates, thioureas, thiurams, dithiophosphates, and sulfenamides. Non-limiting examples of accelerators include: zinc diisobutyldithiocarbamate, zinc salt of 2-mercaptobenzothiazole, hexamethylenetetramine, 1,3diphenyl guanidine, zinc isopropyl xanthate, trimethyl thiourea, tetrabenzyl thiuram disulfide, zinc-O-, O-di-n-butyl-phosphorodithiolate, and N-t-butyl-2-benzothiazole sulfenamide.

Another accelerator suitable for use is a class of xanthogen polysulfides such as dialkyl xanthogen polysulfide. A non-limiting example of a dialkyl xanthogen polysulfide is diisopropyl xanthogen polysulfide, such as is commercially available as Robac AS-100, supplied by Robac Chemicals. Advantageously, Robac AS-100 is free of nitrogen, phosphorus, and metallic elements. It is recommended for use as an accelerator in vulcanization of natural rubber, synthetic polyisoprene, nitrile rubber, etc. where the formation of N-nitrosamines and type-4 allergens is of prime concern. The dialkyl xanthogen polysulfides also act as a sulfur donor.

The sulfur based curing agents and accelerators together make up a sulfur curing system. Normally, both the curing agent (source of sulfur, including soluble and insoluble sulfur, and including organic and inorganic sulfur) and the accelerator should be present before carrying out the rubber curing reactions.

Fillers are used in the rubber compositions to enhance properties, to save money, to facilitate processing, to improve physical properties or for other reasons. A variety of filler materials are known. Such fillers include silica, carbon black, clay, organic fiber, inorganic metal powder, mineral powder, talc, calcium sulfate, calcium silicate, and the like. Typical levels of these and other fillers include from about 10 phr to 100 phr or higher. In various embodiments, the compositions contain 10-80, 30-70, 40-60, 50-60, or 35-60 phr filler.

The rubber compositions may also contain other ingredients in addition to the rubbers, distillates, curatives, and accelerators. These additives are well-known in the art and include activators, processing aids, antioxidant packages, pigments, and the like. Non-limiting examples of specific uses of these additives are given in the examples.

Embodiments according to the disclosure include a severely hydrotreated naphthenic distillate. The compositions include any suitable amount a severely hydrotreated naphthenic distillate, such as, but not limited to, less than 30% by weight of severely hydrotreated naphthenic distillate, less than 20% by weight of severely hydrotreated naphthenic distillate, or even less than 10% by weight of severely hydrotreated naphthenic distillate. Generally, naphthenic oils have a viscosity gravity constant of about 0.85 as described in ASTM D2501, a glass transition temperature (Tg) of about −60° C., and a nominal aniline point of about 90 as described in ASTM D611. The severely hydrotreated naphthenic distillates used in some embodiments will typically have a SUS viscosity index less than 125, or a SUS viscosity index less than 110, or even a SUS viscosity index of 100 or less. In some embodiments, the severely hydrotreated naphthenic distillate has a viscosity that is generally from about 100 to about 121 SUS @ 100 deg F. (37.8 deg C.). Some nonlimiting examples of severely hydrotreated heavy naphthenic distillates which are useful in the compositions of the disclosure include HYPRENE™ 100, HYPRENE™ 60, HYPRENE™ 40, each available Ergon, Inc., PIONEER™ 4320 and NAPREX™ 38 available from ExxonMobil Company.

The compositions according to the disclosure can be compounded in conventional rubber processing equipment. In a typical procedure, all components of the rubber composition are weighed out. The rubber and additives are then compounded in a conventional mixer such as a Banbury mixer. If desired, the compounded rubber may then be further mixed on a roller mill. At this time, it is possible to add pigments such as carbon black. The composition may be allowed to mature for a period of hours prior to the addition of sulfur and accelerators, or they may be added immediately on the roller mill. It has been found to be advantageous to add the accelerators into the Banbury mixer in the later stages of the mixing cycle. Adding the accelerators into the Banbury mixer generally improves their distribution in the rubber composition, and aids in the reduction of the cure time and temperatures that is observed in the compositions of the invention. In general, the elemental sulfur curing compound is not added into the Banbury mixer. Organic sulfides (sulfur donating compounds) may be added to the Banbury mixer.

EXAMPLES

The following experimental data was generated for the purpose of further illustrating the nature of some of the embodiments and aspects of the disclosure, and are not intended as a limitation on the scope thereof. The following three examples were prepared to illustrate improved cold condition flexibility in accordance with some aspects of the disclosure. In the following examples, a sulfur crosslinker containing cure blend was first prepared and then added to a productive mixture which includes the severely hydrotreated naphthenic distillates and crosslinkable rubber.

Example 1

| Raw Material | Parts by Wt | LB204-0003 Blend | Productive | Parts by Wt % |
|---|---|---|---|---|
| Ethylene-propylene ethylidene norbornene rubber | 55 | — | 55 | 10.03 |
| Carbon Black | 305 | — | 305 | 55.6 |
| Hydrotreated Residual Oil | 133 | — | 133 | 24.24 |
| Zinc Oxide | 3 | — | 3 | 0.55 |
| Sulfur | 0.5 | 0.5 | — | 0.09 |
| Mercaptobenzothiazole Disulfide | 3 | 3 | — | 0.55 |
| Ethylene-propylene ethylidene norbornene rubber | 45 | — | 45 | 8.2 |
| 4,4'-Dithiobismorpholine | 0.8 | 0.8 | — | 0.15 |
| Zinc Dibutyldithiocarbamate | 1.5 | 1.5 | — | 0.27 |
| Hexadecanoic/Octadecanoic acid | 1 | — | 1 | 0.18 |
| Tetramethylthiuram Disulfide | 0.8 | 0.8 | — | 0.15 |
| LB204-0003 Cure Blend | — | — | 6.6 | — |
| Total | 548.6 | 6.6 | 548.6 | 100% |

Example 2

| Raw Material | Parts by Wt | LB204-0003 Blend | Productive | Parts by Wt % |
|---|---|---|---|---|
| Ethylene-propylene ethylidene norbornene rubber | 53.2 | — | 53.2 | 13.12 |
| Carbon Black | 80 | — | 80 | 19.72 |
| Carbon Black | 110 | — | 110 | 27.12 |
| Hydrotreated Residual Oil | 87.5 | — | 87.5 | 21.57 |
| Zinc Oxide | 3 | — | 3 | 0.74 |
| Sulfur | 0.5 | 0.5 | — | 0.12 |
| Mercaptobenzothiazole Disulfide | 3 | 3 | — | 0.74 |
| 4,4'-Dithiobismorpholine | 0.8 | 0.8 | — | 0.2 |
| Ethylene-propylene ethylidene norbornene rubber | 46.8 | — | 46.8 | 11.54 |
| Severely Hydrotreated Heavy Naphthenic Distillate | 17.5 | — | 17.5 | 4.31 |
| Zinc Dibutyldithiocarbamate | 1.5 | 1.5 | — | 0.37 |
| Hexadecanoic/Octadecanoic acid | 1 | — | 1 | 0.25 |
| Tetramethylthiuram Disulfide | 0.8 | 0.8 | — | 0.2 |
| LB204-0003 Cure Blend | — | — | 6.6 | — |
| Total | 405.6 | 6.6 | 405.6 | 100% |

Example 3

| Raw Material | Parts by Wt | LB233-0001 Blend | Productive | Parts by Wt % |
|---|---|---|---|---|
| Ethylene-propylene ethylidene norbornene rubber | 66 | — | 66 | 16.53 |
| Carbon Black | 80 | — | 80 | 20.03 |
| Carbon Black | 100 | — | 100 | 25.04 |
| Zinc Oxide | 5 | — | 5 | 1.25 |
| Sulfur | 0.9 | 0.9 | — | 0.23 |
| Mercaptobenzothiazole Disulfide | 3 | 3 | — | 0.75 |
| Ethylene-propylene ethylidene norbornene rubber | 34 | — | 34 | 8.51 |
| Accelerator | 2 | — | 2 | 0.5 |
| Severely Hydrotreated Heavy Naphthenic Distillate | 105 | — | 105 | 26.29 |
| Zinc Dibutyldithiocarbamate | 1.5 | 1.5 | — | 0.38 |
| Hexadecanoic/Octadecanoic acid | 0.65 | — | 0.65 | 0.16 |
| Tetramethylthiuram Disulfide | 1.28 | 1.28 | — | 0.32 |
| LB233-0001 Cure Blend | — | — | 0 | — |
| Total | 399.33 | 6.68 | 399.33 | 100% |

The compositions prepared in examples 1 through 3 where then cured by vulcanization, and thereafter, formed into physical property test samples. The test samples were evaluated for certain physical properties and aging tests, as detailed below. Testing results for Examples 1 through 3 are presented in Table 1 below.

TABLE 1

| | SPECIFICATIONS | Example 1 | Example 2 | Example 3 |
|---|---|---|---|---|
| Original Physical Properties (ASTM D412) | | | | |
| TENSILE (MPa) | >7 | 7.4 | 9.7 | 9.7 |
| ELONGATION (%) | >225 | 338 | 454 | 311 |
| 100% Modulus (MPa) | data | 4 | 3.5 | 3.8 |
| HARDNESS SHORE A (pts.) | data | 77 | 74 | 73 |
| Specific Gravity | data | 1.26 | 1.19 | 1.17 |
| Aging Tests | | | | |
| OVEN AGE (70 hrs @ 100 C.) | | | | |
| TENSILE (MPa) | | 8.1 | 10.2 | 10.2 |
| % Change | data | 6.2 | 3.7 | 5 |
| ELONGATION | | 276 | 364 | 216 |
| % Change | data | −19.2 | −22 | −31 |
| HARDNESS SHORE A | | 75 | 79 | 91 |
| Points Change | data | −0.5 | 4 | 19 |
| IRM 903 OIL IMMERSION (70 hrs. @ 100 C.) | | | | |
| TENSILE (MPa) | | 4.82 | 5.9 | 6 |
| % Change | data | −37 | −40 | −39 |
| ELONGATION | | 219.4 | 263 | 187 |
| % Change | data | −36 | −44 | −40 |
| HARDNESS SHORE A | | 33 | 34 | 42 |
| Points Change | data | −43 | −41 | −31 |
| VOLUME CHANGE | | | | |
| % Change | <100 | 83 | 98 | 83 |
| COLD FLEXIBILITY | No Cracks | −50 deg C. | −40 deg C. | −73 deg C. |
| OZONE (100 hrs @ 100 pphm @ 40 C.) | No Cracks | Pass | Pass | Pass |
| ZINC CHLORIDE* (200 hrs) | No Cracks | Pass | NA | Pass |

*50% zinc chloride aqueous solution

As shown in the examples, in a composition combining severely hydrotreated naphthenic distillates with ethylene-propylene ethylidene norbornene rubber and subsequently vulcanizing the composition, cold flexibility was extended to −100 deg F. (−73 deg C.), without bloom or oil bleed, while providing acceptable or improved physical properties and aging properties.

The foregoing description of the embodiments and examples has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the FIGURES. Spatially relative terms may be intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A composition comprising:
   a) at least one synthetic rubber material;
   b) a severely hydrotreated naphthenic distillate incorporated in amount of from 4% to 30% by weight of the composition; and,
   c) a sulfur curative;

wherein after curing, the composition provides acceptable cold flexibility at a temperature lower than −60 deg C.;

wherein ethylenepropylene-diene copolymer rubber is one of the at least one synthetic rubber material;

wherein all synthetic rubber material comprised in the at least one synthetic rubber material is incorporated in an amount from 22% by weight to 28% by weight based upon total composition weight and, wherein the severely hydrotreated naphthenic distillate has a viscosity from 100 to about 121 SUS @ 37.8 deg C.

2. The composition according to claim 1, wherein after curing, the composition provides acceptable cold flexibility at a temperature as low as −68 deg C.

3. The composition according to claim 1, wherein after curing, the composition provides acceptable cold flexibility at a temperature as low as −73 deg C.

4. The composition according to claim 1, wherein the ethylenepropylene-diene copolymer rubber is selected from the group consisting of ethylene-propylene-cyclopentadiene terpolymer, ethylene-propylene ethylidene norbornene terpolymer, ethylene-propylene-1, 4-hexadiene terpolymer, and mixtures thereof.

5. The composition according to claim 1 further comprising a curing accelerator.

6. The composition according to claim 5, wherein the curing accelerator is mercaptobenzothiazole.

* * * * *